(12) United States Patent
Gorodisher

(10) Patent No.: US 9,156,946 B2
(45) Date of Patent: Oct. 13, 2015

(54) AMINE/THIOL CURING OF BENZOXAZINES

(71) Applicant: 3M INNOVATIVE PROPERTIES COMPANY, St. Paul, MN (US)

(72) Inventor: Ilya Gorodisher, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/239,390

(22) PCT Filed: Sep. 20, 2012

(86) PCT No.: PCT/US2012/056235
§ 371 (c)(1),
(2) Date: Feb. 18, 2014

(87) PCT Pub. No.: WO2013/048851
PCT Pub. Date: Apr. 4, 2013

(65) Prior Publication Data
US 2014/0221601 A1    Aug. 7, 2014

Related U.S. Application Data

(60) Provisional application No. 61/540,031, filed on Sep. 28, 2011.

(51) Int. Cl.
| | |
|---|---|
| *C08G 73/02* | (2006.01) |
| *C09J 179/04* | (2006.01) |
| *C08L 79/04* | (2006.01) |
| *C09D 179/04* | (2006.01) |
| *C08G 73/00* | (2006.01) |

(52) U.S. Cl.
CPC ............ *C08G 73/0233* (2013.01); *C08L 79/04* (2013.01); *C09D 179/04* (2013.01); *C09J 179/04* (2013.01)

(58) Field of Classification Search
CPC ........................................................ C08G 73/02
USPC ..................................................... 528/350, 374
See application file for complete search history.

(56) References Cited

U.S. PATENT DOCUMENTS

| | | |
|---|---|---|
| 4,501,864 A | 2/1985 | Higginbottom |
| 5,543,516 A | 8/1996 | Ishida |
| 6,207,786 B1 | 3/2001 | Ishida |
| 7,041,772 B2 | 5/2006 | Aizawa |

(Continued)

FOREIGN PATENT DOCUMENTS

| | | |
|---|---|---|
| JP | 2009-167251 | 7/2009 |
| JP | 2009-167252 | 7/2009 |

(Continued)

OTHER PUBLICATIONS

Rimdusit, "Development of new class of electronic packaging materials based on ternary systems of benzoxazine, epoxy, and phenolic resins", Polymer, 2000, vol. 41, No. 22, pp. 7941-7949.

(Continued)

*Primary Examiner* — Duc Truong
(74) *Attorney, Agent, or Firm* — Kent S. Kokko

(57) ABSTRACT

Novel oligomers and polymers derived from the reaction of benzoxazine compounds with a mixture of thiol compounds and amine compounds are disclosed. The compositions are useful in coating, sealants, adhesive and many other applications.

11 Claims, 1 Drawing Sheet

(56) References Cited

U.S. PATENT DOCUMENTS

| | | |
|---|---|---|
| 8,389,758 B2 | 3/2013 | Gorodisher |
| 2013/0140738 A1 | 6/2013 | Gorodisher |
| 2014/0010983 A1 | 1/2014 | Gorodisher |
| 2014/0011052 A1 | 1/2014 | Gorodisher |

FOREIGN PATENT DOCUMENTS

| | | |
|---|---|---|
| WO | WO 2005-000955 | 1/2005 |
| WO | WO 2008-076244 | 6/2008 |
| WO | WO 2009-115586 | 9/2009 |
| WO | WO 2010-141396 | 12/2010 |
| WO | WO 2010-141397 | 12/2010 |
| WO | WO 2011-025652 | 3/2011 |
| WO | WO 2012-018753 | 2/2012 |
| WO | WO 2012-092332 | 7/2012 |
| WO | WO 2012-134731 | 10/2012 |
| WO | WO 2012-135180 | 10/2012 |

OTHER PUBLICATIONS

Kimura, "New Thermosetting Resin from Bisphenol A-Based Benzoxazine and Bisoxazoline", Journal of Applied Polymer Science, 1999, vol. 72, No. 12, pp. 1551-1558.

Pocius, "The Electrochemistry of the FPL (Forest Products Laboratory) Process and its Relationship to the Durability of Structural Adhesive Bonds", The Journal of Adhesion, 1992, vol. 39, No. 2-3, pp. 101-121.

Ghosh, "Polybenzoxazine—New high performance thermosetting resins: Synthesis and properties", Progress in Polymer Science, 2007, vol. 32, pp. 1344-1391. XP002681429.

International Search Report for PCT International Application No. PCT/US2012/056235 mailed on Nov. 23, 2012, 4 pages.

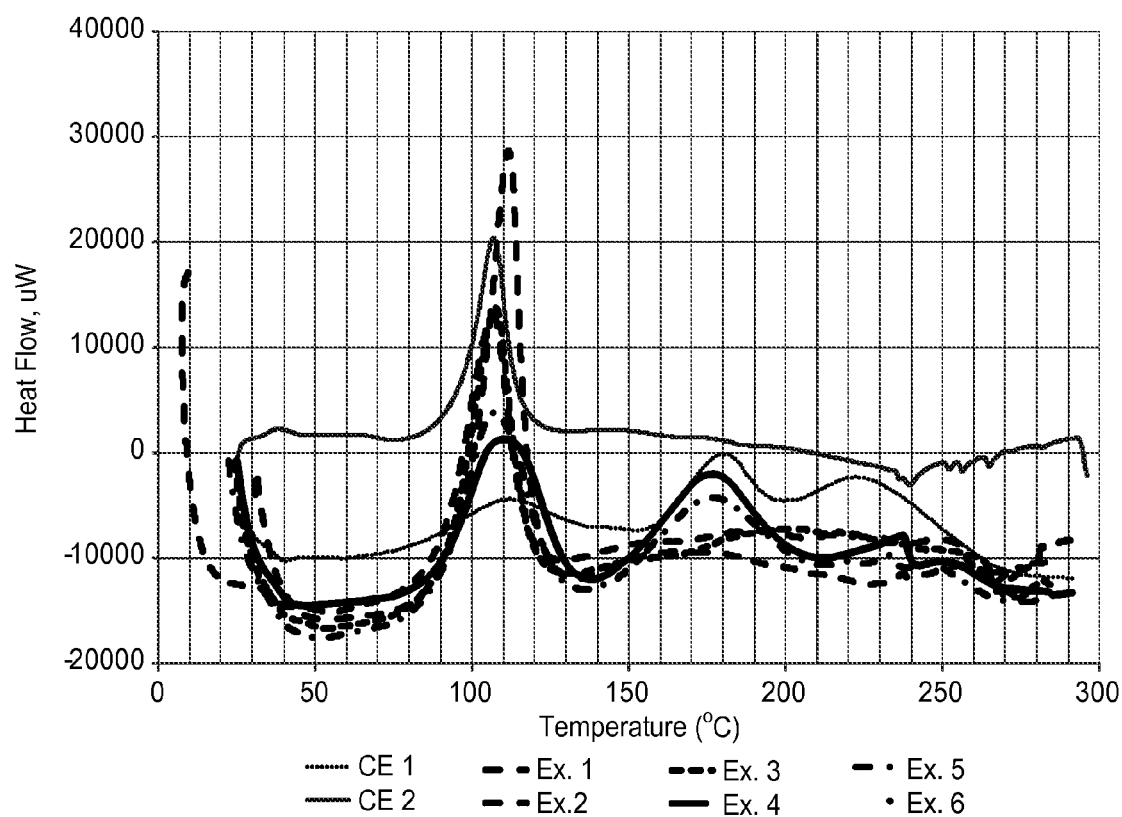

AMINE/THIOL CURING OF BENZOXAZINES

CROSS REFERENCE TO RELATED APPLICATIONS

This application is a national stage filing under 35 U.S.C. 371 of PCT/US2012/056235, filed Sep. 20, 2012, which claims priority to Provisional Application No. 61/540,031, filed Sep. 28, 2011, the disclosure of which is incorporated by reference in its/their entirety herein.

FIELD OF THE INVENTION

The present disclosure is directed to novel oligomers and polymers derived from the reaction of benzoxazine compounds with a mixture of amine compounds and thiol compounds. The compositions are useful in coating, sealants, adhesive and many other applications.

BACKGROUND

Benzoxazines and compositions containing benzoxazine are known (see for example, U.S. Pat. Nos. 5,543,516 and 6,207,786 to Ishida, et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura, et al., "New Thermosetting Resin from Bisphenol A-based Benzoxazine and Bisoxazoline", J. App. Polym. Sci., 72, 1551-58 (1999).

U.S. Pat. No. 4,501,864 (Higginbottom) reports a curable composition comprising a poly(3,4-dihydro-3-substituted-1,3 benzoxazine) and a reactive polyamine, wherein the polyamine is at least difunctional and its reactive groups are primary or secondary amine, and wherein the poly(dihydrobenzoxazine) is the reaction product of about one equivalent of a primary amine, about one equivalent of a phenol and about two equivalents of formaldehyde.

PCT Published Patent Application WO 2010/141396 A1 (Gorodisher et al.) describes benzoxazine-thiol adducts which may be cured to produce compositions useful in coatings, sealants, adhesives, and other applications. Similarly, PCT Published Patent Application WO 2009/115586 A1 (Burns et al.) describes adducts useful for improving the toughness and curable compositions using such toughening adducts.

SUMMARY

The present disclosure is directed to novel benzoxazine-thiol/amine adducts. Further, the present disclosure is directed to a method of preparing the adducts, which comprises reacting a benzoxazine compound with a thiol compound and a primary or secondary amine compound, the reaction resulting in ring-opening of the oxazine ring, and resulting in a mixture of sulfanylmethyl aminophenolic and aminomethyl aminophenolic compounds. The present benzoxazine-thiol/amine adducts may be cured to produce cured compositions useful in coating, sealants, adhesive and many other applications. The present disclosure further provides a curable composition comprising a benzoxazine compound, a primary or secondary amine compound and a thiol compound, which when cured is useful in adhesive, coating and bonding applications. Unexpectedly, the amine and thiol compounds both independently contribute to the ring opening of the benzoxazine, despite the known acid-base reaction between the thiol and amine compounds.

In the process of preparing the benzoxazine-thiol adducts, each of the starting materials may be mono- or higher functionality. The benzoxazine may be a mono- or higher benzoxazine, the amine compound may be a mono- or higher amine, and the thiol compound may be a mono- or higher thiol. However at least one of the thiol and amine compounds must be a polyfunctional compound, i.e. a polythiol or a polyamine.

As used herein the term "benzoxazine" is inclusive of compounds and polymers having the characteristic benzoxazine ring. In the illustrated benzoxazine group, R is the residue of a mono- or polyamine.

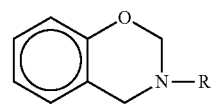

I where R represents a (hetero)hydrocarbyl groups, including (hetero)alkyl and (hetero)aryl groups.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl. and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein "(hetero)hydrocarbyl" is inclusive of (hetero)hydrocarbyl alkyl and aryl groups, and hetero(hetero) hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

BRIEF DESCRIPTION OF THE DRAWINGS

FIG. 1 are the differential scanning calorimetry (DSC) plots of the indicated examples and comparative examples.

DETAILED DESCRIPTION

The present disclosure is directed to novel benzoxazine-thiol/amine adducts, prepared by the reaction of a benzoxazine with a mixture of an amino compound and a thiol compound. The adducts are characterized as having the characteristic group resulting from ring opening of the oxazine ring with an amine and a thiol group. The benzoxazine-amine/thiol adducts may be described as a mixture of aminomethyl aminophenolic and sulfanylmethyl aminophenolic compounds, which may be oligomeric or polymeric. In the illustrated structure, $R^5$ is the residue of a mono- or polyamine and $R^4$ is the residue of a mono- or polythiol, and $R^1$ is the residue of an aldehyde.

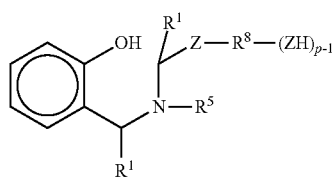

wherein
each $R^1$ is H or an alkyl group, and is the residue of an aliphatic aldehyde,
$R^5$ is the (hetero)hydrocarbyl residue of a primary amino compound, which may be a mono- or polyamine
$R^8$ is the (hetero)hydrocarbyl group,
Z is a mixture of —S— and —$NR^9$, where $R^9$ is H or a hydrocarbyl group, including aryl and alkyl, and
p is 1 to 6.

It will be understood that the moiety —Z—$R^8$—(ZH)$_{p-1}$ represents the residue of a mixture of amine and thiol compounds that are used to ring-open and cure the starting benzoxazine compounds.

As used herein the term "residue" is used to define that (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero)hydrocarbyl polyethylene glycol —$(C_2H_4O)_{1-20}$—$C_2H_4$—.

In the preparation of the benzoxazine-thiol adducts, any benzoxazine compound may be used. Benzoxazines may be prepared by combining a phenolic compound, and aliphatic aldehyde, and a primary amine compound. U.S. Pat. No. 5,543,516 (Ishida), hereby incorporated by reference, describes a solventless method of forming benzoxazines. U.S. Pat. No. 7,041,772 (Aizawa et al.) describes a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure. Other suitable reaction schemes to produce mono-, di- and higher-functional benzoxazines are described in N. N. Ghosh et al., *Polybenzoxazine-new high performance thermosetting resins: synthesis and properties, Prog. Polym. Sci.* 32 (2007), pp. 1344-1391. One suitable method of producing the starting benzoxazine compounds is illustrated by the following reaction scheme:

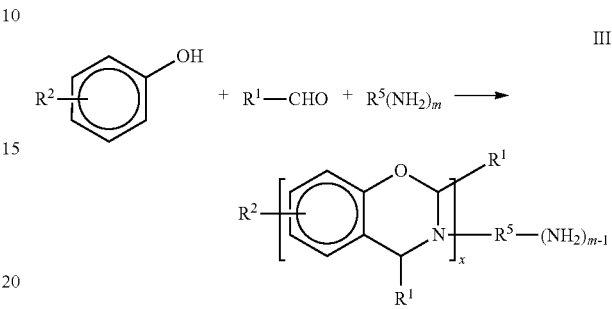

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-6; and
x is at least 1. It will be understood that the free amino groups depicted may further react to produce additional benzoxazine groups.

A monophenol is illustrated for simplicity. Mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

With respect to the $R^2$ group of Formula III, numerous phenolic compounds are contemplated. $R^2$ may be an H, a covalent bond "—" which represents a biphenyl-type phenolic compounds, or $R^2$ may be a divalent aliphatic group linking aryl rings. For example, $R^2$ may be a divalent isopropyl group, derived from bisphenol-A, generally illustrated as follows:

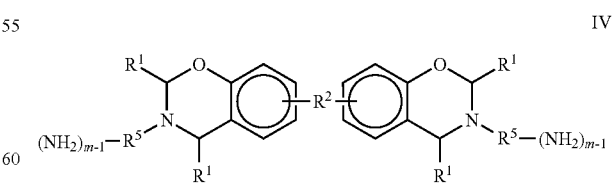

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;

$R^5$ is the (hetero)hydrocarbyl residue of a primary amino compound, $R^5(NH_2)_m$, where m is 1-6. It will be understood that the free amino groups depicted may further react to produce additional benzoxazine groups.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol, 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, di-substituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl. It has been observed that benzoxazines derived from aromatic amines, such as aniline, are less reactive toward the thiol reactants than benzoxazines derived from aliphatic amines as indicated, for example by the corresponding reaction temperatures.

Amines useful in the preparation of the starting benzoxazine compounds include those of the formula:

$$R^5(NH_2)_m \qquad \qquad V$$

and include (hetero)hydrocarbyl monoamines and polyamines. $R^5$ may be (hetero)hydrocarbyl group that has a valence of m, and is the residue of a mono-, di- or higher amine having at least one primary amine group. $R^5$ can be an alkyl, a cycloalkyl or aryl and m 1 to 4. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides).

Any primary amine may be employed. Useful monoamines include, for example, methyl-, ethyl-, propyl-, hexyl-, octyl-, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as diallylamine and allylmethylamine.

It will be understood that monoamines will cyclize with the aldehyde and phenolic compound to produce mono-benzoxazine compounds, while di- or higher amines will cyclize to produce di- and poly-benzoxazine compounds: For example, a diamine (m=2 in the Scheme VI below) will produce a di-benzoxazine.

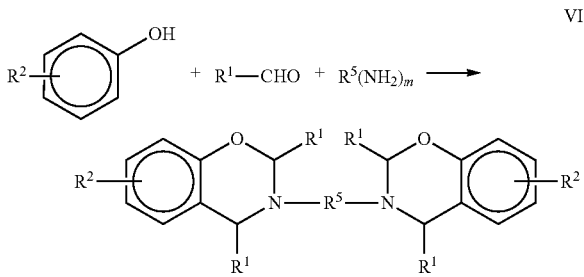

wherein each $R^1$ is H or an alkyl group, and is the residue of an aliphatic aldehyde;
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
and m is 2.

If a polyamine and a polyphenol are used in the preparation, a polybenzoxazine will result. As used herein the term polybenzoxazine will refer to compounds having two or more benzoxazine rings. The term "poly(benzoxazine)" will refer to polymers resulting from acid-catalyzed ring-opening and homopolymerization of benzoxazine compounds.

$$H_2NR^5 \left[ \begin{array}{c} R^1 \\ \vert \\ (NH_2)_{m-2} \end{array} \text{—benzoxazine structure—} \begin{array}{c} R^1 \\ \vert \\ (NH_2)_{m-2} \end{array} \right]_z NH_2$$

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.

Polymeric and oligomeric benzoxazines ring-opened adducts may be prepared from a mixture of a thiol compound and an amine compound as illustrated in reaction Schemes below.

The benzoxazine ring is opened with thiols of the formula:

$$R^4\text{—}(SH)_n \qquad \text{VII}$$

where n is 1 to 6. $R^4$ includes any (hetero)hydrocarbyl groups, including aliphatic and aromatic monothiols and polythiols. $R^4$ may optionally further include one or more functional groups including hydroxyl, acid, ester, cyano, urea, urethane and ether groups.

In some preferred embodiments, the thiol compounds are of the formula:

$$R^6\text{—}[(CO_2)_x\text{—}R^7\text{—}SH]_y, \qquad \text{VIII}$$

where $R^6$ is an alkylene group, an aryl group, an oxyalkylene group, or combination thereof, $R^7$ is a divalent hydrocarbyl group, x is 0 or 1,
y is 1 to 6.

Useful thiol compounds falling within the scope of Formula VII include thiols is of the formulas:

$$R^6\text{—}[(O\text{—}\overset{O}{\overset{\|}{C}})_x\text{—}R^7\text{—}SH]_y, \qquad \text{IX}$$

$$R^6\text{—}[(\overset{O}{\overset{\|}{C}}\text{—}O)_x\text{—}R^7\text{—}SH]_y, \text{ and} \qquad \text{X}$$

$$R^6\text{—}[R^7\text{—}SH]_y \qquad \text{XI}$$

wherein
$R^6$ is an alkylene group, an aryl group, an oxyalkylene group, or combination thereof,
$R^7$ is a divalent hydrocarbyl group,
x is 0 or 1,
y is 1 to 6. Preferably the compounds of Formulas IX to XI are those in which $R^6$ is an alkylene group.

Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate)pentaerythritol tetrakis(3-mercaptopropionate), all of which are commercially available. A specific example of a preferred polymeric polythiol is polypropylene ether glycol bis(3-mercaptopropionate) which is prepared from polypropylene-ether glycol (e.g. Pluracol™ P201, BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of ~245 and the following general structure, where n is at least 1:

$$HS\text{—}\underset{OH}{\overset{}{\text{—}}}\left[O\text{—}\text{(bisphenol A)}\text{—}O\text{—}\right]_n\underset{OH}{\overset{}{\text{—}}}SH$$

Useful soluble, high molecular weight thiols include polyethylene glycol di(2-mercaptoacetate), LP-3™ resins supplied by LP North America. (Houston, Tex.), and Permapol P3™ resins supplied by Products Research & Chemical Corp. (Glendale, Calif.) and compounds such as the adduct of 2-mercaptoethylamine and caprolactam.

The benzoxazine ring is further ring-opened by an amine compound. Useful amine compounds correspond to primary and secondary amines of the formula:

$$R^{10}(NHR^9)_m, \qquad \text{XII}$$

and include primary and secondary (hetero)hydrocarbyl monoamines and polyamines $R^{10}$ may be (hetero)hydrocarbyl group that has a valence of m, and is the residue of a mono-, di- or higher amine having at least one primary amine group. $R^{10}$ can be an alkyl, a cycloalkyl or aryl and m 1 to 4. The $R^{10}$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Each $R^9$ is independently H or a hydrocarbyl group, including aryl and alkyl, and m is 1 to 6.

It will be clear to one skilled in the art that the same amines used in the preparation of the benzoxazines (supra) will also be useful in the ring-opening reaction, in combination with the thiol compounds.

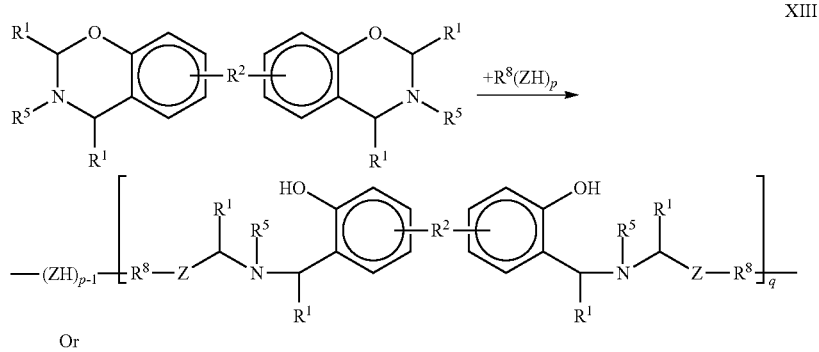

XIII

Or

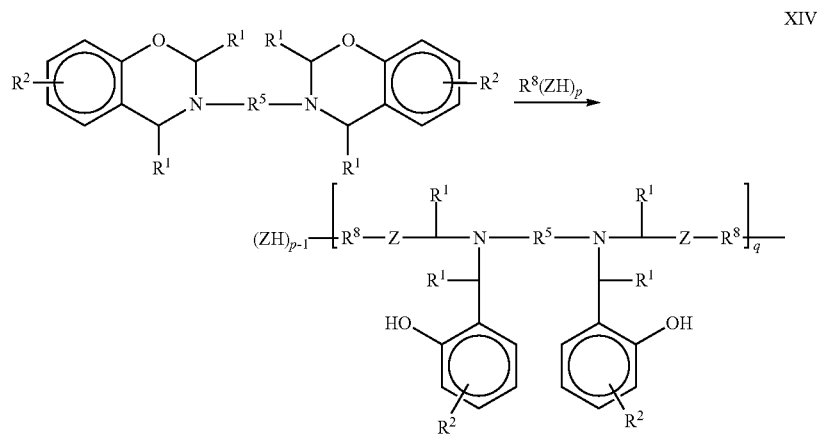

XIV where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^8$ is the (hetero)hydrocarbyl group,
Z is a mixture of —S— or —NR$^9$, where each $R^9$ is H or a hydrocarbyl group, including aryl and alkyl,
p is 1 to 6;
q is at least 1, preferably at least 2.

As will be clear from the ring-opening reaction schemes, the mixture of amine and thiol compounds is represented by the formula:

$$R^8—(ZH)_p,$$   XV where
$R^8$ is the (hetero)hydrocarbyl group,
Z is a mixture of —S— or —NR$^9$, where $R^9$ is H or a hydrocarbyl group, including aryl and alkyl, and
p is 1 to 6.

Note that Schemes XIII and XIV, and other schemes herein, the product depicts a mixture of free thiol and amine groups "Z". The depiction is used to account for all the Z groups present in the starting materials, which are available for subsequent reaction. Thus the starting bis-benzoxazine reacts with the mixture of the amine compound (XII) and the thiol $R^4(SH)_n$, (VII) and the initial reaction product has "n−1" Z groups, which may be available for further reaction with additional benzoxazine groups. Further, the starting benzoxazine was prepared for a polyamine, therefore $R^5$ groups may be connected to additional benzoxazine groups.

Note further that as the composition comprises at least one polyfunctional thiol compound or amine compound, polymeric reaction products result.

The mixture of amine and thiol compounds represented by Formula XV is used in amounts such that the molar ratio of the sum of the amine and thiol groups to the benzoxazine groups is from 2:1 to 1:10, preferably 1:1 to 1:2. The ratio of thiol equivalents to amine equivalents in the mixture of Formula XV is from 50:1 to 1:5. It will be understood that a primary amine has two molar equivalents and a secondary amine has one molar equivalent.

In some embodiments it is preferable to have an excess of benzoxazine, as an unreacted benzoxazine will homopolymerize to form a coextensive mixture or polymer network of benzoxazine-thiol/amine adduct and poly(benzoxazines). In such embodiments, the molar amounts ratio of benzoxazine groups to the sum of amine and thiol groups is about 1.1:1 to 50:1

The compounds of Schemes XIII and XIV may be prepared by combining the benzoxazine compounds, the amine compounds and the thiol compounds neat or in a suitable solvent. Suitable solvents include those in which the reactants dissolve, preferably at room temperature. Solvents may include that is non-reactive with the reactants and that provides for the subsequent dissolution of co-reactants. Examples of suitable solvents include butyl acetate, toluene, xylene, tetrahydrofuran, ethylene glycol dimethyl ether and the like. Heating is generally unnecessary as the thiol and amine-induced ring opening is exothermic.

If desired an acid catalyst may be used to promote the ring-opening of the benzoxazine. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Acid catalysts may be used in amounts of 2 wt. % or less, preferably 1 wt. % or less, most preferably 0.5 wt. % or less, relative to the amounts of benzoxazine and thiol reactants.

The compositions may be used as coatings, including hard surface coatings, and pattern coatings; as adhesives, including pressure sensitive adhesives and structural adhesives; as sealants; and as coatings for electronics and other substrates. When uncured or partially cured, the benzoxazine compositions exhibit pressure-sensitive adhesive properties, including tack. In some embodiments, the present disclosure provides a coated article comprising a substrate, having a cured coating of the benzoxazine-thiol adduct thereon.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl(meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

The instant disclosure further provides a pressure sensitive adhesive which comprises a coating of the uncured or partially cured benzoxazine composition on a suitable substrate, such as an adhesive tape backing. A preferred method of preparing a pressure sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

EXAMPLES

Abbreviations

The following abbreviations have been used in the document below:
BNZOX—Araldite® 35600 benzoxazine from Huntsman Advanced Materials Americas Inc., The Woodlands, Tex., USA.
THIOL 1—Thiocure® TMPMP from BRUNO BOCK Chemische Fabrik GmbH & Co., Marschacht, Germany.
THIOL 2—Thiocure® ETTMP 1300 from BRUNO BOCK Chemische Fabrik GmbH & Co., Marschacht, Germany.
THIOL 3—A mixture of 2 parts Thiocure® TMPMP (THIOL 1, above) and 1 part Paraloid™ EXL-2600 core shell toughener from The Dow Chemical Company, Midland, Mich., compounded at room temperature and mixed until translucent.
THIOL 4—A mixture of 2 parts Thiocure® ETTMP 1300 and 1 part Paraloid™ EXL-2600 core shell toughener, compounded at room temperature and mixed until translucent.
AMINE 1—MXDA from MITSUBISHI GAS CHEMICAL COMPANY, INC., Tokyo, Japan.
Procedures and Test Methods Except where specified to the contrary, amounts are given in equivalents (eq). Equivalents are based on the moles of reactive groups per mole of reactant molecule. Hence, 2 equivalents of a bifunctional reactant represents one mole of that reactant, and one mole of a trifunctional reactant would represent 3 eq of that reactant. Catalysts are treated as if mono-functional.

Differential Scanning calorimetry (DSC) was performed on an aliquot of a given reaction mixture that was placed into an open aluminum DSC pan and heated at 10° C./min from 25° C. to 300° C. in a Differential Scanning calorimeter (Seiko Instruments USA, Inc., Torrance, Calif.).

Cohesive Strength was measured using the Overlap Shear Strength Test (OLS), as described in ASTM International test procedure ASTM D 1002-05, "Standard Test Method for Apparent Shear Strength of Single-Lap-Joint Adhesively Bonded Metal Specimens by Tension Loading (Metal-to-Metal.) Overlap, or "lap", shear specimens were made using 4 in×7 in×0.063 in (10 cm×18 cm×0.16 cm) 7075 T6 bare aluminum that had been degreased according to Boeing Aircraft Company Specification BAC-5749. This degreasing process included first soaking the aluminum samples in a caustic solution, followed by a water rinse. Next, the samples were etched in a highly acidic sodium dichromate/sulfuric acid/aluminum solution. The samples were then anodized in a phosphoric acid solution according to Boeing Aircraft Company Specification BAC-5555. The anodization voltage was 15 volts. The specimens were generated as described in ASTM Test Method D-1002-05.

The specific coating conditions varied, as described below in each Example. Generally, a strip of approximately 0.5 in (1.3 cm)×0.15 mm of adhesive was applied to one edge of each of the two adherends using a scraper. Three 75-micrometer diameter piano wires were used as spacers for bond-line thickness control. The bond was closed and taped on the edge. The bond was placed between sheets of aluminum foil and pieces of cardboard. Two 14 lb (6.4 kg) steel plates were used both placed on top of the cardboard to apply pressure to provide for adhesive spreading. After the adhesive had been allowed to cure (as described in each Example), the large specimen was cut into 1 in (2.5 cm) wide smaller specimens, providing a 0.5 in$^2$ (3.2 cm$^2$) bonded area. Six lap shear specimens were obtained from each larger specimen. The bonds were tested to failure at room temperature on a SINTECH Tensile Testing machine (MTS Systems Corporation, Eden Prairie, Minn.), using a crosshead displacement rate of 0.1 in/min (0.254 cm/min.) The failure load was recorded. The lap width was measured with a Vernier caliper. The quoted lap shear strengths are calculated as (2 times the failure load)/(measured width). The average (mean) and standard deviation were calculated from the results of six tests.
Floating Roller Peel (FRP) Strength Test for Adhesive Film Primed panels of 2024-T3 bare aluminum measuring 8 inches long by 3 inches wide by 0.063 inches thick (20.3× 7.6×0.16 centimeters), and 10 inches long by 3 inches wide by 0.025 inches thick (25.4×7.6×0.064 centimeters), were prepared for testing as described below in "Forest Products Laboratory (FPL) Etched and Phosphoric Acid Anodized Aluminum Substrate." The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch (2.54 cm.)

Forest Products Laboratory (FPL) Etched and Phosphoric Acid Anodized Aluminum Substrate The aluminum substrates as described above were treated as follows before bonding:
1) soaking for 10 minutes in a caustic wash solution such as ISOPREP 44, available from Martin Aerospace, Los Angeles, Calif., USA, at a temperature of 160±10° F. (71° C.);
2) submerging the sheets (in a rack) in tank of tap water for 10 minutes;
3) spray rinsing with tap water for 2-3 minutes;
4) soaking at 150° F. (66° C.) for 10 minutes in a tank of FPL etch (a hot solution of sulfuric acid, sodium dichromate, and aluminum, according to section 7 of the latest revision of ASTM D-2651, similar to the process described by Forest Products Laboratory of Madison, Wis., USA; see *The Electrochemistry of the FPL (Forest Products Laboratory) Process and its Relationship to the Durability of Structural Adhesive Bonds*, A. V. Pocius, The Journal of Adhesion, Volume 39, Issue 2-3, 1992);
5) spray rinsing with tap water for 3-5 minutes;
6) drip drying for 10 minutes at ambient temperature and then for 30 minutes in a re-circulating air oven at 150° F. (71° C.)

In all cases, the panels were further treated as follows. The etched panels were anodized by immersion in phosphoric acid at 22° C. with an applied voltage of 15 Volts for 20-25 minutes, followed by rinsing with tap water. With the wet sample surfaces approximately horizontal, the water film was observed to check for any "water breaks" where the surface developed unwetted regions, which would indicate surface contamination. This step was followed by air drying for 10 minutes at room temperature, then oven drying in a forced air oven at 66° C. for 10 minutes. The resulting anodized aluminum panels were immediately primed within 24 hours of treatment. The anodized panels were primed with a corrosion inhibiting primer for aluminum (3M Scotch-Weld™ Structural Adhesive Primer EW-5000, available from 3M Company, St. Paul, Minn., USA) according to the manufacturer's instructions to give a dried primer thickness of between 0.00010 and 0.00020 inches (2.6 to 5.2 micrometers).

Comparative Example 1

1.33 g (0.01 mol thiol) of THIOL 1 were added to 2.31 g (0.01 mol of benzoxazine) of finely ground BNZOX at room temperature. The components were stirred to a uniform mass, and an aliquot was taken to obtain the differential scanning calorimetry (DSC) trace labeled CE1 in FIG. 1.

Comparative Example 2

0.34 g (0.01 mol amine) of AMINE 1 were added to 2.31 g (0.01 mol of benzoxazine) of finely ground BNZOX at room temperature. The components were stirred to a uniform mass, and an aliquot was taken to obtain the DSC trace labeled CE 2 in FIG. 1.

Example 1

0.133 g (0.001 mol of thiol) of THIOL 1 were added to 0.306 g of AMINE 1 (0.009 mol amine), and the resulting solution was added to 2.31 g (0.01 mol of benzoxazine) of finely ground BNZOX at room temperature. The components were stirred to a uniform mass, and an aliquot was taken to obtain the DSC trace labeled Ex. 1 in FIG. 1.

Example 2

1.33 g (0.01 mol of thiol) of THIOL 1 were added to 1.02 g of AMINE 1 (0.03 mol amine), and the resulting solution was added to 9.24 g (0.04 mol of benzoxazine) of finely ground BNZOX at room temperature. The components were stirred to a uniform mass, and an aliquot was taken to obtain the DSC trace labeled Ex. 2 in FIG. 1.

Example 3

1.33 g (0.01 mol of thiol) of THIOL 1 were added to 0.68 g of AMINE 1 (0.02 mol amine), and the resulting solution was added to 6.93 g (0.03 mol of benzoxazine) of finely ground BNZOX at room temperature. The components were stirred to a uniform mass, and an aliquot was taken to obtain the DSC trace labeled Ex. 3 in FIG. 1.

Example 4

1.33 g (0.01 mol of thiol) of THIOL 1 were added to 0.34 g of AMINE 1 (0.01 mol amine), and the resulting solution was added to 4.62 g (0.02 mol of benzoxazine) of finely ground BNZOX at room temperature. The components were stirred to a uniform mass, and an aliquot was taken to obtain the DSC trace labeled Ex. 4 in FIG. 1.

Example 5

2.66 g (0.02 mol of thiol) of THIOL 1 were added to 0.34 g of AMINE 1 (0.01 mol amine), and the resulting solution was added to 6.93 g (0.03 mol of benzoxazine) of finely ground BNZOX at room temperature. The components were stirred to a uniform mass, and an aliquot was taken to obtain the DSC trace labeled Ex. 5 in FIG. 1.

Example 6

3.99 g (0.03 mol of thiol) of THIOL 1 were added to 0.34 g of AMINE 1 (0.01 mol amine), and the resulting solution was added to 9.24 g (0.04 mol of benzoxazine) of finely ground BNZOX at room temperature. The components were stirred to a uniform mass, and an aliquot was taken to obtain the DSC trace labeled Ex. 6 in FIG. 1.

In the combination thiol-amine co-cure, the fact of the benzoxazines cure is in itself very surprising. Amine cure should be inhibited or arrested completely by the acid-base interaction brought on by the addition of acidic thiols. Without wishing to be bound by theory, an amine that is complexed by a thiol in an acid-base interaction should provide a delayed onset of cure versus the free amine case, and one with a higher temperature exotherm peak because it would require additional energy to break that acid-base interaction and to recruit the amine for the ring opening of the benzoxazine.

In the latter 3 examples, (Examples 4 through 6), sufficient amount of thiol was added for at least stoichiometric equivalence (vs. primary+secondary amines) and up to three-fold molar excess (vs. amine,) and with the thiol added directly to the amine: certainly more than sufficient to tie up all the available amines in such acid-base pairs.

Thus, the fact that no change in the profile of the amine cure of benzoxazine is observed is not only surprising, but counterintuitive. In fact, no decrease in the peak of the amine cure exotherm is observed in any of the cases, per FIG. 1, above.

Adhesion

Comparative Example 3

To 23.1 grams (0.1 mol of benzoxazine) of BNZOX heated to 100° C. was added 6.8 grams (0.1 mol amine) of AMINE 1 and 5.2 grams of Paraloid™ 2600 core-shell particles (Paraloid™ EXL-2600? available from The Dow Chemical Company, Midland, Mich.) The components were stirred while hot. The reactive composition was deposited between two silicone coated polyethyleneterephthalate (PET) liners and 125 micrometer thick film was pulled through a hot (100° C.) knife. The film was then used to prepare overlap shear (OLS) and fixed roller peel (FRP) samples as described previously. The samples were cured at 180° C. for 2 hours. Overlap shear and peel tests were then performed as described previously to obtain the measurements listed in Table 1 below.

Example 7

To 23.1 grams (0.1 mol of benzoxazine) of BNZOX heated to 100° C. was added a mixture of 2.24 grams (0.033 mol amine) of AMINE 1 and 13.2 grams (0.066 mol thiol) of THIOL 3. The components were stirred while hot. The reactive composition was deposited between two silicone coated PET liners and 125 micrometer thick film was pulled through a hot (100° C.) knife. The film was then used to prepare overlap shear and FRP samples as described previously. The samples were cured at 180° C. for 2 hours. Overlap shear and peel tests were then performed as described previously to obtain the measurements listed in Table 1 below.

Example 8

To 23.1 grams (0.1 mol of benzoxazine) of BNZOX heated to 100° C. was added a mixture of 2.24 grams (0.033 mol amine) AMINE 1, 28.9 grams (0.066 mol) of THIOL 2 and 9.5 grams of Paraloid 2600. The components were stirred while hot. The reactive composition was deposited between two silicone coated PET liners and 125 micrometer thick film was pulled through a hot (100° C.) knife. The film was then used to prepare overlap shear and FRP samples as described previously. The samples were cured at 180° C. for 2 hours. Overlap shear and peel tests were then performed as described previously to obtain the measurements listed in Table 1 below.

In the above table, 15% CS means 15 wt % Paraloid 2600 CoreShell toughener. Similarly, in the table entry for Example 7, BNZOX/AMINE1/THIOL3/312, means 3 parts BNZOX, 1 part Amine, 2 parts Thiol. Since THIOL3 is 1 part Paraloid™ EXL-2600 Core Shell to 2 parts Thiol 1, it works out that the CS (core shell) is present at 11% by wt.

The data suggest that the choice of a proper thiol co-curing agent can have a dramatic effect on the peel bond strength of the benzoxazine compositions. Meanwhile, the overlap shear strength does increase significantly to nearly double for the ETTMP1300 and more than double for the TMPMP co-cure. The thiol-amine co-cured sample performance improvement is even more striking in light of a more processible, B-stageable cure afforded by the independent dual curatives.

This disclosure is illustrated by the following embodiments:

1. A curable composition comprising a benzoxazine, a thiol compound and an amine compound, wherein at least one of said thiol compound and amine compound is polyfunctional.

2. The curable composition of embodiment 1 wherein said thiol compound is a polythiol.

3. The curable composition of embodiment 1 wherein said amine compound is a polyamine.

4. The curable composition of embodiment 1 comprising a polythiol and polyamine.

5. The curable composition of any of the previous embodiments wherein the benzoxazine is a polybenzoxazine.

6. The curable composition of embodiment 5 wherein the polybenzoxazine is of the formula:

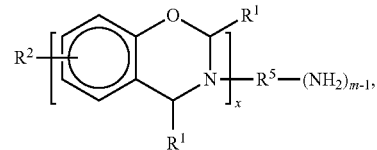

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 2-4; and
x is at least 1.

7. The curable composition of embodiment 6 wherein $R^5$ is a poly(alkyleneoxy) group.

8. The curable composition of embodiment 5 wherein the polbenzoxazine compound is of the formula:

TABLE 1

Amine/thiol benzoxazine cure vs. amine benzoxazine cure and adhesive performance

| Example Number | COMPOSITION | OLS | | | FRP | | |
|---|---|---|---|---|---|---|---|
| | | Mean | Max | SD | Mean | Max | SD |
| CEx. 3 | BisABZ/AMINE1 1/1 (15% CS) | 980 | 1912 | 568 | 3.0 | 3.2 | 0.3 |
| Ex. 7 | BNZOX/AMINE1/THIOL3 3/1/2 (11% CS) | 2097 | 2494 | 291 | 1.93 | 2.12 | 0.15 |
| Ex. 8 | BisABZ/AMINE1/THIOL2 3/1/2 (15% CS) | 1793 | 1866 | 60 | 35.2 | 39.4 | 4.7 |

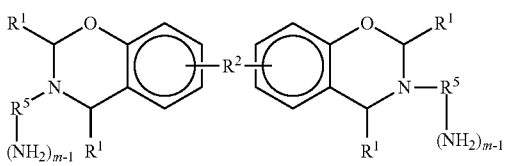

each of $R^1$ is H or an alkyl group;
$R^2$ is H, a covalent bond, or a divalent (hetero)hydrocarbyl group;
m is 2-4
$R^5$ is the (hetero)hydrocarbyl group.

9. The curable composition of embodiment 5 wherein the polybenzoxazine compound is of the formula:

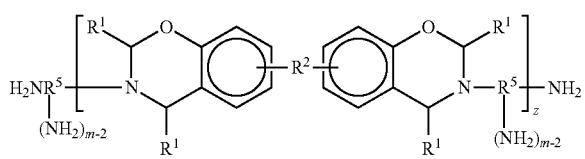

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.

10. The curable composition of any of embodiments 2 to 10 wherein the polythiol is of the formula $R^4$—$(S$—$H)_n$, where $R^4$ is an (hetero)hydrocarbyl having a valence of n, and n is 1 to 6.

11. The curable composition of embodiment 10 wherein $R^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.

12. The curable composition of any of the previous embodiments wherein the mixture of amine and thiol compounds is represented by the formula:

$$R^8—(ZH)_p, \text{ where}$$

$R^8$ is the (hetero)hydrocarbyl group,

Z is a mixture of —S— or —$NR^9$, where each $R^9$ is H or a hydrocarbyl group, including aryl and alkyl, and
p is 1 to 6.

13. The curable composition of any of the previous embodiments comprising a thiol compound is of the formula:

$$R^4—(SH)_n,$$

where n is 1 to 6 and $R^4$ is a (hetero)hydrocarbyl group.

14. The curable composition of any of the previous embodiments, wherein said amine is of the formula:

$$R^{10}(NHR^9)_p, \text{ wherein}$$

$R^{10}$ is (hetero)hydrocarbyl group;
p is 1 to 6, and
each $R^9$ is H or a hydrocarbyl group.

15. A ring opened benzoxazine oligomer of the formulas:

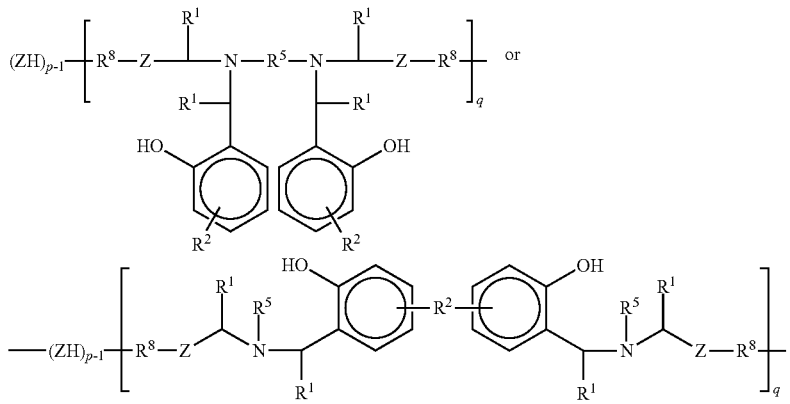

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^8$ is the (hetero)hydrocarbyl group,
Z is a mixture of —S— or —$NR^9$, where each $R^9$ is H or a hydrocarbyl group, including aryl and alkyl, and
p is 1 to 6.

16. An oligomer having the structure:

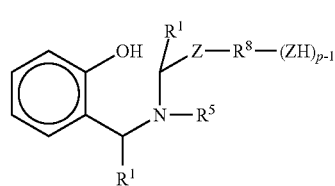

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, which may be a mono- or polyamine
$R^8$ is the (hetero)hydrocarbyl group, Z is a mixture of —S— and —NR$^9$, where each R$^9$ is H or a hydrocarbyl group, including aryl and alkyl, and
p is 1 to 6.

What is claimed is:

1. A curable composition comprising a benzoxazine, a thiol compound of the formula: R$^4$—(SH)$_n$, where n is 1 to 6 and R$^4$ is a (hetero)hydrocarbyl group;
    and an amine compound of the formula: R$^{10}$(NHR$^9$)$_p$, wherein R$^{10}$ is (hetero)hydrocarbyl group; p is 1 to 6, and each R$^9$ is H or a hydrocarbyl group, and wherein at least one of said thiol compound and amine compound is polyfunctional and wherein the benzoxazine ring is opened with the thiol compound and the amine compound, wherein
    the molar ratio of the sum of the amine and thiol groups to the benzoxazine groups is from 2:1 to 1:10, and the ratio of thiol equivalents to amine equivalents is from 50:1 to 1:5.

2. The curable composition of claim 1 wherein said thiol compound is a polythiol.

3. The curable composition of claim 1 wherein said amine compound is a polyamine.

4. The curable composition of claim 1 comprising a polythiol and polyamine.

5. The curable composition of claim 1 wherein the benzoxazine is a polybenzoxazine.

6. The curable composition of claim 5 wherein the polybenzoxazine is of the formula:

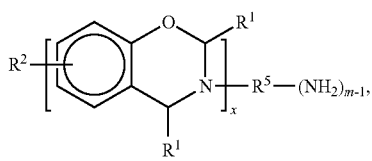

wherein
each of R$^1$ is H or an alkyl group;
R$^2$ is H, a covalent bond, or a polyvalent (hetero)hydrocarbyl group;
R$^5$ is the (hetero)hydrocarbyl residue of a primary amino compound having a valence of x,
m is 2-4; and
x is at least 1.

7. The curable composition of claim 6 wherein R$^5$ is a poly(alkyleneoxy) group.

8. The curable composition of claim 5 wherein the polbenzoxazine compound is of the formula:

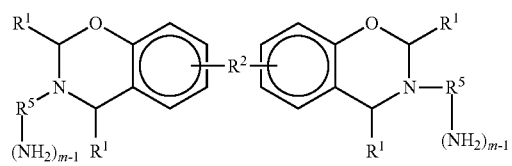

each of R$^1$ is H or an alkyl group;
R$^2$ is H, a covalent bond, or a divalent (hetero)hydrocarbyl group;
m is 2-4
R$^5$ is the (hetero)hydrocarbyl group.

9. The curable composition of claim 5 wherein the polybenzoxazine compound is of the formula:

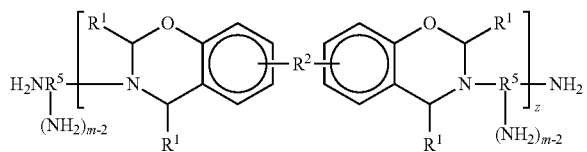

wherein,
each of R$^1$ is H or an alkyl group;
R$^2$ is a covalent bond, or a divalent (hetero)hydrocarbyl group;
m is 2-4;
z is at least 2;
R$^5$ is the divalent (hetero)hydrocarbyl residue of a primary diamino compound.

10. The curable composition of claim 1 wherein R$^4$ is a non-polymeric aliphatic, cycloaliphatic, aromatic or alkyl-substituted aromatic moiety having from 1 to 30 carbon atoms and optionally 1 to four catenary heteroatoms of oxygen, nitrogen or sulfur.

11. The curable composition of claim 1 wherein the mixture of amine and thiol compounds is represented by the formula:
R$^8$—(ZH)$_p$, where
R$^8$ is the (hetero)hydrocarbyl group,
Z is a mixture of —S— or —NR$^9$, where each R$^9$ is H or a hydrocarbyl group, including aryl and alkyl, and
p is 1 to 6.

* * * * *